United States Patent [19]

Ogawa

[11] Patent Number: 4,860,028

[45] Date of Patent: Aug. 22, 1989

[54] PRINT HEAD ASSEMBLY

[75] Inventor: Yoshihisa Ogawa, Nagakakyo, Japan

[73] Assignee: Data Card Corporation, Minneapolis, Minn.

[21] Appl. No.: 937,602

[22] Filed: Dec. 3, 1986

[51] Int. Cl.[4] .......... G01D 15/10; B41J 3/20

[52] U.S. Cl. .......... 346/76 PH; 400/120

[58] Field of Search .......... 346/76 PH; 400/120

[56] References Cited

U.S. PATENT DOCUMENTS

| | | | |
|---|---|---|---|
| D. 261,152 | 10/1981 | Barbour | D18/14 |
| 1,690,442 | 11/1928 | Chisholm | 83/109 |
| 3,538,848 | 11/1970 | Barbour | 101/269 |
| 3,954,056 | 5/1976 | Barbour | 101/269 |
| 4,025,956 | 5/1977 | Nozaki et al. | 360/2 |
| 4,103,066 | 7/1973 | Brooks et al. | 428/337 |
| 4,104,515 | 8/1978 | Thornburg et al. | 235/488 |
| 4,125,336 | 11/1978 | Chu | 400/124 |
| 4,126,824 | 11/1978 | Thornburg et al. | 324/62 |
| 4,236,834 | 12/1980 | Hafer et al. | 400/120 |
| 4,239,107 | 12/1980 | Boyatt, Jr. et al. | 206/225 |
| 4,297,039 | 10/1981 | Lees | 400/120 |
| 4,309,177 | 1/1982 | Kane et al. | 8/516 |
| 4,324,178 | 4/1982 | Barbour | 101/45 |
| 4,350,449 | 9/1982 | Countryman et al. | 400/120 |
| 4,384,797 | 5/1983 | Anderson et al. | 400/696 |
| 4,385,848 | 5/1983 | Camosso | 400/208 |
| 4,393,768 | 7/1983 | Barbour | 101/45 |
| 4,399,348 | 8/1983 | Bakewell | 219/216 |
| 4,400,100 | 8/1983 | Aviram et al. | 400/120 |
| 4,408,908 | 10/1983 | Applegate et al. | 400/120 |
| 4,413,919 | 11/1983 | Applegate et al. | 400/308 |
| 4,421,429 | 12/1983 | Graham | 400/120 |
| 4,453,839 | 6/1984 | Findlay et al. | 400/120 |
| 4,461,586 | 7/1984 | Kawanishi et al. | 400/120 |
| 4,470,714 | 9/1984 | Aviram et al. | 400/241.1 |
| 4,477,198 | 10/1984 | Bowlds et al. | 400/120 |
| 4,507,666 | 3/1985 | Kondo et al. | 346/76 PH |
| 4,527,172 | 7/1985 | Nagashima et al. | 346/76 PH |
| 4,553,861 | 11/1985 | Lendl | 400/120 |
| 4,569,606 | 2/1986 | Hoyes | 400/144.2 |
| 4,688,785 | 8/1987 | Nubson et al. | 271/266 |
| 4,695,850 | 9/1987 | Nubson | 346/76 PH |

FOREIGN PATENT DOCUMENTS

| | | | |
|---|---|---|---|
| 57-146666 | 9/1982 | Japan | 400/120 |
| 59-162069 | 9/1984 | Japan | 400/120 |

OTHER PUBLICATIONS

Exhibit A-1-page brochure entitled, "Basic Specifications of Thermal Print Head", Printed in Japan, Apr. 1984.

(List continued on next page.)

*Primary Examiner*—E. A. Goldberg
*Assistant Examiner*—Gerald E. Preston
*Attorney, Agent, or Firm*—Merchant, Gould, Smith, Edell, Welter & Schmidt

[57] ABSTRACT

A printer head includes a platen roller, a drive frame movable toward and away from the platen roller, a support block provided on the drive frame, a printing head element secured to the support block to be movable toward and away from the platen roller which it opposes, a pair of freely rotatable guide rollers mounted on the support block and having the printing head element interposed therebetween, a conveying mechanism for conveying a card to be printed on between the printing head element and the platen roller, an ink ribbon which travels while in contact with the pair of guide rollers and the printing head during printing, the ribbon being arranged between the card and the printing head element, a signal source for applying a print signal to the printing head element to cause the element to transfer ink from the ink ribbon to the card, a position adjusting screw provided on the support block to be movable back and forth, the printing head element being positionally adjusted back and forth relative to the platen roller by bringing the head of the position adjusting screw into abutment with a fixed portion of the drive frame, and a printing pressure adjusting mechanism operative in the printing state to press the printing head element against the card via the ink ribbon at a predetermined printing pressure and to adjust the printing pressure.

8 Claims, 3 Drawing Sheets

OTHER PUBLICATIONS

Exhibit B-2-page brochure entitled, "Ricoh Thermal Print Head Product Flash", Printed in Japan, Oct. 1983.

Exhibit C-2-page brochure entitled, "Ricoh Thermal Print Head", Printed in Japan Apr. 1984.

Exhibit D-2-page brochure entitled "Ricoh Thermal Print Head", printed in Japan, Oct. 1983.

Exhibit E-4-page brochure entitled, "Ricoh TH-1101", printed in Japan, Sep. 1983.

Exhibit F-2-page brochure entitled, "Ricoh TH-3104", printed in Japan, Apr. 1984.

Exhibit G-2-page brochure entitled, "Thermal Recorder/Printer Module TR-200A", printed in Japan, May, 1984.

Exhibit H-"Thermal Recorder/Printer Module TR-101A", printed in Japan, May 1984.

Exhibit I-2-page brochure entitled, "Thermal Recorder/Printer Module TR-100A", printed in Japan, May, 1984.

Exhibit J-2-page brochure entitled, "Thermal Recorder/Printer Module TR-500A, TR-501A", printed in Japan, May, 1984.

Exhibit K-8-page brochure with 6 numbered pages and entitled, "Thin Film Thermal Printheads, K.S. KMI Series", printed in Japan.

Exhibit L-2-page brochure entitled, "Fujitsu Mini--Thermal Printer, Printer Unit FTP-020UC", printed in USA (OS2077-838N-839-M2).

PRINT HEAD ASSEMBLY

BACKGROUND OF THE INVENTION

This invention relates to a printer head used in a printer for printing on cards. More particularly, the invention relates to a printer head used in a printer for printing on the surface of cards made of plastic or paper by means of an electrical system.

Many printer heads have been developed for use in electrical printers capable of printing on the surface of cards made of plastic or paper. One example of such printer head is of a structure in which an electric current is made to flow instantaneously in accordance with a print signal from an electrode pin connected to a positive electrode of a signal source toward an ink ribbon connected to a negative electrode, the ink on the ink ribbon is fused by Joule heat generated directly below the energized electrode pin, and the fused ink is transferred to the plastic or paper card as a dot, which constitutes the minimum printing unit. In the conventional printer head of this type, the electrode pin is mounted on a single frame, which is driven by a solenoid, either directly or via simple cushion mechanism. This results in a problem wherein the electrode pin is pressed against the card surface too lightly, too strongly or unevenly. In addition, to pass the electric current into the ink ribbon, it is required that the ink ribbon side be connected to the negative electrode in a reliable manner. In the conventional printer head, however, the state of the connection is imperfect, as a result of which the current cannot be passed through the ribbon reliably.

SUMMARY OF THE INVENTION

Accordingly, an object of the present invention is to provide a printer head in which an electrode pin can be pressed against a card surface with an appropriate force in a reliable manner.

Another object of the present invention is to provide a printer head in which the side of an ink ribbon can be connected to a negative electrode reliably to assure that a current can be made to flow from an electrode pin to the ink ribbon.

According to the present invention, the foregoing objects are attained by providing a printer head comprising: a platen roller provided to be freely rotatable about a fixed axis; a driven frame provided to move in a back-and-forth direction with respect to the platen roller; a support block provided on the drive frame to be movable in the back-and-forth direction; a printing head element secured to the support block in a state movable in the back-and-forth direction and provided to be capable of opposing the platen roller; a pair of guide rollers, which are freely rotatable about respective axes, mounted on said support block in such a manner that said printing head element is interposed therebetween; conveying means for conveying a sheet-like member, which is to be printed on, between the printing head element and the platen roller; an ink ribbon driven in accordance with a printing operation so as to travel in a state where it is in contact with the pair of guide rollers and the printing head, the ribbon being arranged between the sheet-like member, which is in a printing state, and the printing head element; a signal source for applying a print signal to the printing head element, in response in which print signal the printing head element transfers ink from the ink ribbon to the sheet-like member; a position adjusting screw provided on the support block to be movable back and forth, the printing head element being positionally adjusted back and forth relative to the platen roller by bringing a distal end of the position adjusting screw into abutting contact with a fixed portion of the drive frame; and printing pressure adjusting means operative in the printing state for pressing said printing head element against said sheet-like member through the intermediary of said ink ribbon at a predetermined printing pressure and for adjusting the printing pressure.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of a printer head according to the present invention will now be described in detail with reference to the accompanying drawings.

Figure 1:
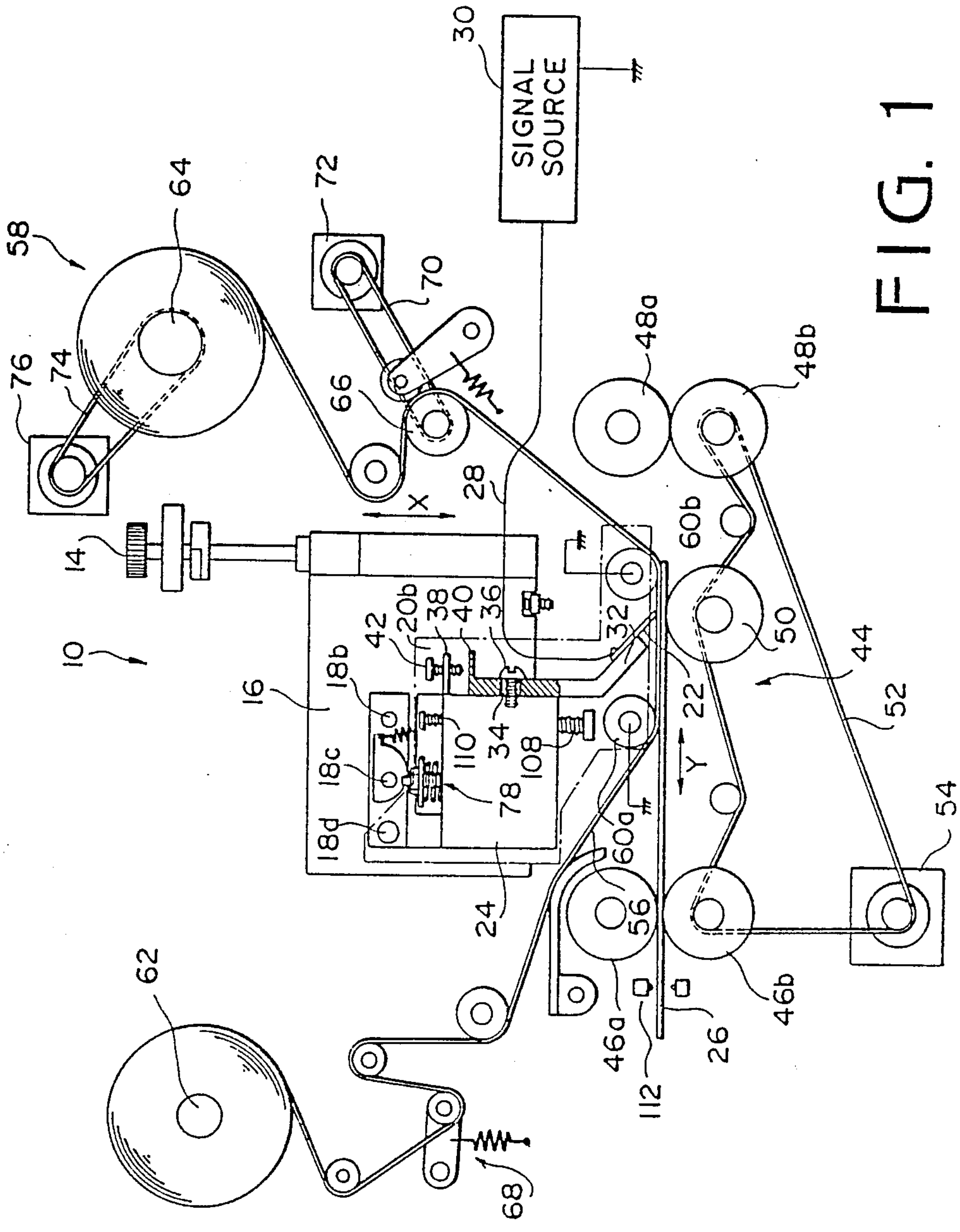
FIG. 1 is a plan view diagrammatically illustrating the arrangement of one embodiment of a printer head according to the present invention.
Figure 2:
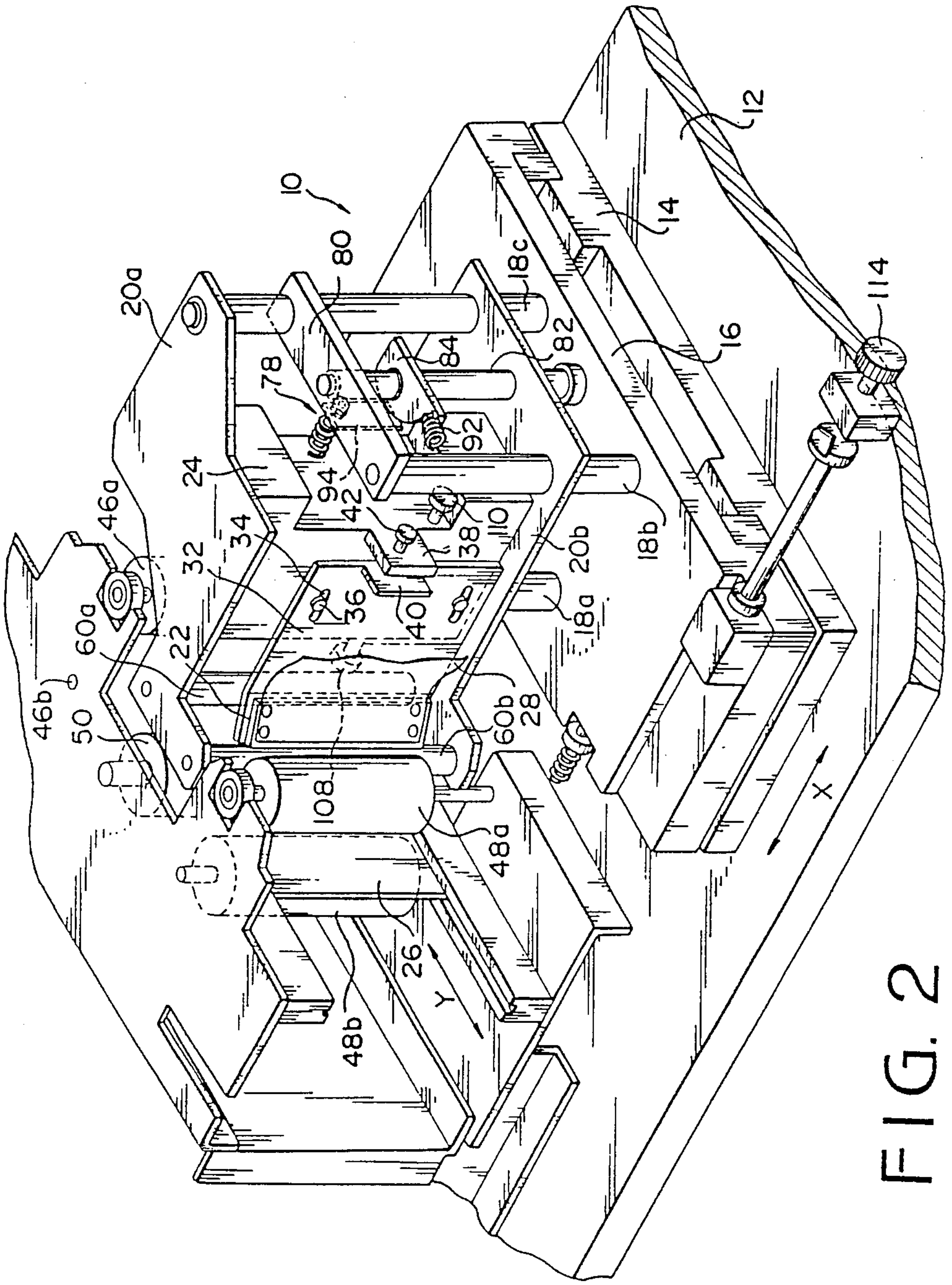
FIG. 2 is a perspective view illustrating a principal portion of the printer head of FIG. 2 as seen from the rear.

As shown in FIG. 1 and 2, a printer head 10 in accordance with the invention includes a table 12 on which a drive frame 16 is so provided via a drive frame seat 14 as to be movable back and forth as indicated by the arrow X. A pair of support frames 20*a*, 20*b* spaced apart a prescribed distance in the vertical direction are fixedly provided on the drive frame 16 via a plurality of support columns 18*a*–18*c*. A mounting block 24 for mounting a printing head element 22 is so provided between the two support frames 20*a*, 20*b* as to be movable in the direction of arrow X.

The printing head element 22 comprises a multiplicity of electrode pins arranged so as to extend in a row widthwise of a card 26, as a sheet-like member, on which printing is to be performed. Each electrode pin is connected via a lead wire 28 to a signal source 30, which is shown in FIG. 1. Each lead wire 28 is connected to a positive electrode of the signal source 30. The printing head element 22 is so mounted on the side face of the mounting block 24 via a mounting frame 32 as to be movable in the direction of arrow X. More specifically, the mounting frame 32 is formed to include a pair of slots 34 extending in the direction of arrow X, and mounting screws 36 are screwed into the side face of the mounting block 24 upon being passed through respective ones of the slots 34. Loosening the mounting screws 36 allows the printing head element 22 to be moved in the direction of arrow X.

In order that the mounting frame 32 may be positionally adjusted in the direction of arrow X, mounting tabs 38, 40 are integrally provided on the rearward portion of the mounting block 24 and mounting frame 32, respectively. An adjustment screw 42 is screwed into the mounting tab 38 of mounting block 24 so as to be freely movable back and forth in the direction of arrow X. Thus, by loosening the mounting screw 36 and then turning the adjustment screw 42 back and forth, the mounting frame 32, namely the printing head element 22, can be moved relative to the mounting block 24 in the X direction to adjust the gap between the distal end of the printing head element 22 and the card 26.

The card 26 to be printed on is conveyed in the upright state in the longitudinal direction thereof, namely in the direction of an arrow Y. To this end, the printer head 10 is equipped with a card conveyance mechanism 44. As shown in FIG. 1, the card conveyance mechanism 44 comprises a pair of entrance rollers 46a, 46b provided astride the conveyance path of the card 26 on the card inlet side, a pair of exit rollers 48a, 48b provided astride the conveyance path of the card 26 on the card outlet side, a platen roller 50 provided at a position opposing the printing head element 22, and a first drive motor 54 located on the side of the card opposite the printing head element 22 and adapted to circulate a belt 52 to rotate the entrance roller 46b, exit roller 48b and platen roller 50.

When printing is being performed, the first drive motor 54 feeds the card 26 through the head in such a manner that the printing time allotted to each card will be 1.6 sec. However, when the card is being conveyed into the entrance portion and conveyed out of the exit portion, the first drive motor 54 feeds the card 26 at a speed higher than that which prevails at printing.

In order to facilitate the introduction of the card 26 and protect the distal end of the printing head element 22, the latter is arranged at an angle of inclination of e.g. 45° with respect to the conveyance direction Y of the card 26.

A ribbon feed mechanism 58 is so provided as to assure that an ink ribbon 56 will always be present between the card 26 and printing head element 22 in a state where the card 26 is situated between the platen roller 50 and printing head element 22.

The ribbon feed mechanism 58 comprises a pair of guide rollers 60a, 60b arranged freely rotatably between the two support frames 20a, 20b and situated on both sides of the printing head element 22, a ribbon supply sleeve 62 upon which an as yet unused ribbon 56 is wound, a ribbon take-up sleeve 64 upon which the ribbon 56 is wound up after being used, and a capstan roller 66 provided between the exit side guide roller 60b and the ribbon take-up sleeve 64 and adapted to feed the ink ribbon 56 so that the latter may be wound upon on the sleeve 64.

The two guide rollers 60a, 60b and the capstan roller 66 are arranged in such a manner that a line segment connecting the two guide rollers 60a, 60b and a line segment connecting the exit-side guide roller 60b and capstan roller 66 define a predetermined acute angle. Such an arrangement assures that the ribbon 56 will engage the exit-side guide roller 60b at a predetermined angle in a reliable manner. The roller 60b is made of an electrically conductive material and is grounded to a negative electrode. This arrangement assures that the ink ribbon 56 will be grounded reliably. As a result, a signal current from the signal source 30 will flow into the ink ribbon 56 from the printing head element 22, namely the electrode pins, in reliable fashion. Thus, electrode pins into which current flows are reliably heated, the ink on the ink ribbon 56 contacted by the heated electrode pins is fused and the fused ink is transferred to the card 26 in the form of printed dots.

Arranged between the ribbon supply sleeve 62 and entrance-side guide roller 60a is a back-tension mechanism 68 for applying back tension to the traveling ribbon 56. The capstan roller 66 is rotatively driven by a second drive motor 72 acting through a belt 70. The ribbon take-up sleeve 64 is rotatively driven by a third drive motor 76 acting through a belt 74.

Provided between the belt 74 and the ribbon take-up sleeve 64 is a slip mechanism, not shown. The arrangement is such that the slip mechanism acts to prevent the speed at which the ribbon 56 is taken up on the take-up sleeve 64 from exceeding that at which the ribbon 56 is taken up by the capstan roller 66.

Figure 3:
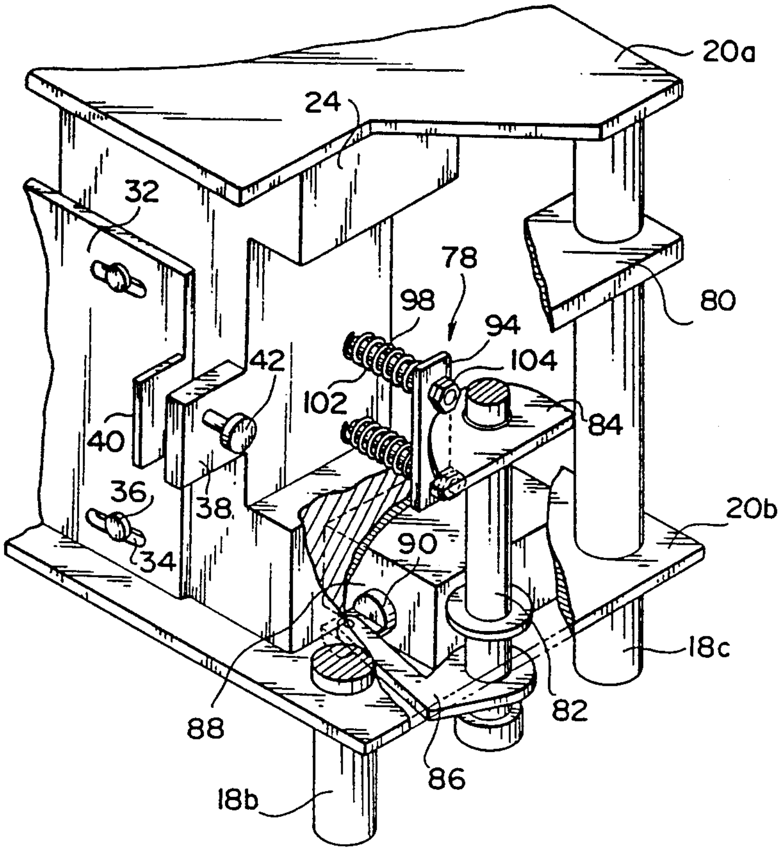
FIG. 3 is an enlarged perspective view, partially cut away, showing a printing pressure adjustment mechanism depicted in FIG. 2.
Figure 4:
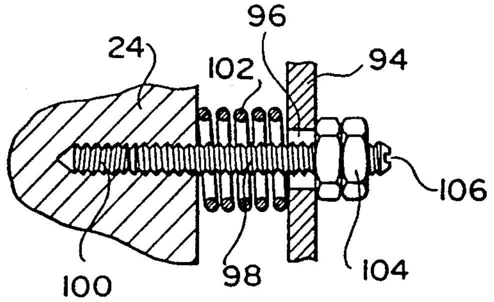
FIG. 4 is a sectional view illustrating a principal portion of the printing pressure adjustment mechanism extracted from the arrangement of FIG. 3.

A printing pressure adjustment mechanism 78 for adjusting the printing pressure of the printing head element 22 will now be described with reference to FIGS. 3 and 4.

The printing pressure adjustment mechanism 78 has an auxiliary plate 80 bridging the two rearward support columns 18b, 18c so as to be supported between the two support frames 20a, 20b. Provided between the two support columns 18b, 18c and rotatably supported at its ends by the auxiliary plate 80 and drive frame 16 is a camshaft 82 that penetrates the lower support frame 20b. Secured to the camshaft 82 at an intermediate point therealong is a cam plate 84. The cam plate 84 has a cam surface designed so that the distance from the center to the outer periphery thereof grows gradually larger within a range of about 90° as the camshaft 82 rotates.

An oscillating arm 86 has one end thereof fixedly secured to the lower portion of the camshaft 82. The other end of the arm 86 is pivotally supported on a projecting end of an actuator 90 of an electromagnetic solenoid 88. As shown in FIG. 2, one end of the cam plate 84 is connected to the support block 24 via a coil spring 92. Owing to an urging force applied by the spring 92, the camshaft 82 receives a rotational biasing force that rotates it in the clockwise direction in FIG. 3. In other words, the actuator 90 receives a biasing force that forces it into the electromagnetic solenoid 88. Energizing the solenoid 88 drives the actuator 90 outwardly from the interior of the solenoid to rotate the camshaft 82 and, hence, the cam plate 84, in the counter-clockwise direction.

The cam plate 84 is adapted so that the shortest portion of its cam face will be brought to a position opposing an urging plate 94, described below, when the electromagnetic solenoid 88 in the deenergized state, and so that the longest portion of its cam face will abut against the urging plate 94 and move it toward the support block 24 when the electromagnetic solenoid 88 in the energized state.

The urging plate 94 is arranged between the cam plate 84 and support block 24. The urging plate 94 has a pair of upper and lower through-holes 96 through each of which is passed a screw rod 98, as shown in FIG. 4. Each screw rod 98 is screwed into a screw hole 100 formed in the back face of the support block 24. Thus, the urging plate 94 is capable of being moved via the screw rods 98 in the direction indicated by arrow X.

A coil spring 102 is wound about each screw rod 98 on the portion thereof between the support block 24 and urging plate 94. Each coil spring 102 applies a force that urges the plate 94 to the rear. A double nut 104 is screwed onto the rearwardly projecting end of each screw rod 98 to prevent the urging plate 94 from slipping off the screw rod.

Formed in the rearwardly projecting end face of each screw rod 98 is a slot 106 into which a turning tool such as a screwdriver is inserted. By turning each screw rod 98 with a screwdriver inserted into the slot 106, the screw rod can be moved toward or away from the support block 24, thus making it possible to adjust the magnitude of the urging force applied by the coil springs 102.

By virtue of the printing pressure adjustment mechanism 78 having the above-described construction, a prescribed gap is provided between the cam face of the cam plate 84 and the urging plate 94 when the electromagnetic solenoid 88 is in the deenergized state. Accordingly, the support block 24 is capable of moving in the direction of arrow X by an amount corresponding to this gap. When the electromagnetic solenoid 88 is in the energized state, on the other hand, the urging plate 94 is pushed forward resiliently against the urging force of the coil spring 102 by the cam plate 84. In this state, the printing head element 22 is brought into resilient abutting contact, at a predetermined printing pressure, with the peripheral surface of the platen roller 50 through the intermediary of the ink ribbon 56 in a case where the card 26 is not yet located on the platen roller 50. When the card 26 is conveyed in and situated on the platen roller 50, the printing head element 22, namely the support block 24, is drawn backwardly against the urging force of the coil springs 102 by an amount equivalent to the thickness of the card 26.

The forward position of the support block 24 in the direction of arrow X is adjusted by a forward position adjustment screw 108 (FIG. 1) screwed into the front end face of the support block 24. The rearward position of support block 24 in the direction of arrow X is adjusted by a rearward position adjustment screw 110 (FIG. 1) screwed into the rear end face of the support block 24. More specifically, the forward position adjustment screw 108 is mounted so as to be freely movable back and forth in the X direction with respect to the support block 24, and the head portion of screw 108 is capable of abutting against the guide roller **60*a* on the entrance side. Thus, adjusting the amount by which the screw 108 protrudes from the support block 24 regulates the position at which the head portion of the screw 108 abuts against the entrance-side guide roller 60*a*, thereby adjusting the forward position of the support block 24**.

The rearward position adjustment screw 110 is mounted so as to be freely movable back and forth in the X direction with respect to the support block 24, and the head portion of screw 110 is capable of abutting against the rearward support column **18*b*. Thus, adjusting the amount by which the screw 110 protrudes from the support block 24 regulates the position at which the head portion of the screw 110 abuts against the support column 18*b*, thereby adjusting the rearward position of the support block 24**.

The operation of the printer head 10 having the foregoing construction will now be described.

The card 26 to be printed on is conveyed into the printer head 10 along the conveyance path in the direction of arrow Y. The fact that the card 26 has been conveyed into the head is sensed by a sensor, such as a photocoupler 112, arranged on the entrance side of the conveyance path. The sensor is adapted to provide a control circuit (not shown) with a signal indicative of the fact that the card has been conveyed into the printer head 10. Based on the sensor output signal applied thereto, the control circuit executes an operation for winding up the ink ribbon 56 via the ribbon feed mechanism 58, and an operation for printing on the card 26 by way of the printing head element 22.

More specifically, the second and third drive motors 72, 76 of the ribbon feed mechanism 58 begin drive upon passage of a period of time needed for the leading edge of the card 26 to reach a printing position, which is defined between the printing head element 22 and the platen roller 50, after the leading edge of the card has been sensed by the sensor. The ink ribbon 56 is driven to travel at a prescribed speed in dependence upon the drive supplied by the motors 72, 76.

Upon passage of the abovementioned period of time, the signal source 30 outputs a printing signal to the printing head element 22. Based on the printing signal, a plurality of the electrode pins constituting the printing head element 22 are energized with current and thus heated. The ink on the portion of the ink ribbon 56 contacted by the tips of these heated electrode pins is fused and the fused ink is transferred to the surface of the card 26, whereby ink dots corresponding to the heated electrode pins are formed on the card surface.

When conveyed into the printing position, the card 26 is embraced by the two entrance-side conveyance rollers **46*a*, 46*b* and at the same is held between the two guide rollers 60*a*, 60*b* and the platen roller 50. Since the card 26 is thus positively retained by the rollers 46*a*, 46*b*, 50, 60*a*, 60*b*, the card can be stably maintained in the desired attitude. The mounting frame 32 on which the printing head 22 is mounted is fixedly secured to the side face of the mounting block 24 via the slots 34 and mounting screws 36 in such a manner that the attitude of the frame 32 can be freely adjusted. Thus, the attitudes of the card 26 and printing head element 22 relative to each other can be set in reliable fashion, thereby enabling the end face of the printing head element 22 to be precisely set so as to extend in a direction at right angles to the longitudinal axis of the card 26. Accordingly, the printing head element 22 can be made to contact the card 26** at a uniform printing pressure.

Further, the ink ribbon 56 is engaged with the guide rollers **60*a*, 60*b* at a predetermined angle, and the guide rollers 60*a*, 60*b* are electrically conductive and connected to the negative side. The ink ribbon 56 is thus reliably connected to the negative side. This assures that an electric circuit made up of the signal source 30, lead wire 28, printing head element 22, ink ribbon 536 and guide rollers 60*a*, 60*b* will form a closed loop. As a result, the printing signal is delivered to the printing head element 22** in a reliable manner to a realize an excellent condition for printing.

When all of the ink ribbon 56 has been wound up on the take-up sleeve 64 so that the end of the ink ribbon is reached, the ribbon 56 is replaced. In exchanging the ribbon, a lock on a knob 114 connected to the drive frame 16 is released and the knob is pulled backward, thereby moving the drive frame 16 in such a manner that it parts from the platen roller 50. As a result, the printing head element 22 and the two guide rollers **60*a*, 60*b* arranged on the drive frame 16 are also withdrawn so as to separate widely from the conveyance path. Thus, the two guide rollers 60*a*, 60*b* and the platen roller 50 part widely from each other to form a large clearance between them that enables the ink ribbon 50** to be replaced in a very simple manner.

In a state where the card 26 has not reached the printing position, the end face of the printing head element 22 is held at a position spaced slightly away from the outer peripheral surface of the platen roller 50. In other words, the arrangement is such that this gap is set to be slightly less than the thickness of the card 26 so that the end of the printing head 22 will reliably contact the surface of the card 26, when the latter has been conveyed into printing position, through the intermediary of the ink ribbon 56. The position of the end of printing head element 22 much thus be regulated with great precision. This is accomplished in the printer head 10 by bringing the head portion of the above-described position adjustment screw 108 into abutting contact with the guide roller 60*a* on the entrance side. In this manner the end position of the printing head element 22 is correctly set. By moving the position adjustment screw 108 back and forth with respect to the support block 24, this position can be adjusted.

At the moment the leading edge of the card 26 is sensed by the sensor 112, the electromagnetic solenoid 88 is energized, as a result of which the camshaft 82 and, hence, the cam plate 84, is rotated. The cam face of cam plate 84 having the longest surface is thus engaged with the urging plate 94, which is pushed inward against the force of the coil springs 102. In consequence, the head portion of position adjustment screw 108 is contacted resiliently with the entrance-side guide roller 60*a* by the urging force of the coil springs 102. In this state the card 26 is conveyed to the printing position. The card 26 thus conveyed into position engages the end of the printing head element 22, and the head element 22, namely the mounting block 24, is urged back against the urging force of the coil springs 102.

Thus, the card 26 is brought into pressured contact with the end face of the pringing head element 22 through the intermediary of the ink ribbon 56 at a desired printing pressure. By virtue of the above arrangement, any change in the thickness of the cards introduced into the printer head 10 is absorbed by the coil springs 102. Therefore, the printer head 10 is capable of dealing with any card introduced regardless of its thickness.

In addition, the stroke of the coil springs 102 in the printing pressure adjustment mechanism 78 is adjusted by turning the screw rods 98 through the slots 106 to move the screw rods back and forth with respect to the mounting block 24. This enables the printing pressure to be adjusted.

As many apparently widely different embodiments of the present invention can be made without departing from the spirit and scope thereof, it is to be understood that the invention is not limited to the specific embodiments thereof except as defined in the appended claims.

What is claimed is:

1. A printer head comprising:

a platen roller provided to be freely rotatable about a fixed shaft;

a drive frame provided to move in a back-and-forth direction with respect to said platen roller;

a support block provided on said drive frame to be movable in said back-and-forth direction;

a printing head element secured to said support block in a state movable in said back-and-forth direction and provided to be capable of opposing said platen roller;

a pair of guide rollers, which are freely rotatable about respective shafts, mounted on said support block in such a manner that said printing head element is interposed therebetween;

conveying means for conveying a sheet-like member, which is to be printed on, between said printing head element and said platen roller;

an ink ribbon driven in accordance with a printing operation to travel in a state where it is in contact with said pair of guide rollers and said printing head, said ribbon being arranged between said sheet-like member, which is in a printing state, and said printing head element;

a signal source for applying a print signal to said printing head element, in response to which signal said printing head element transfers ink from said ink ribbon to said sheet-like member;

a position adjusting screw provided on said support block to be movable back and forth, a forward position of said printing head element relative to said platen roller being adjusted by bringing a distal end of said position adjusting screw into abutting contact with a fixed portion of said drive frame; and printing pressure adjusting means operative in the printing state for pressing said printing head element against said sheet-like member through the intermediary of said ink ribbon at a predetermined printing pressure and for adjusting the printing pressure, said printing pressure adjusting means including:

a screw rod provided to be movable back and forth, on a face of said support block opposite that on which said printing head element is provided;

an urging plate loosely penetrated by said screw rod and provided to be movable in said back-and-forth direction without slipping off said screw rod;

an urging member provided between said urging plate and said support block for urging said urging plate and said support block away from each other; and printing pressure means operative in the printing state for pressing said urging plate against an urging force from said urging member in such a manner that said urging plate approaches said support block, whereby said printing head element is resiliently brought into contact with said sheet-like member through the intermediary of said ink ribbon at the predetermined printing pressure.

2. The printer head according to claim 2, wherein said printing pressure means includes:

an electromagnetic solenoid disposed on said drive frame;

a camshaft rotably erected on said drive frame and connected to said electromagnetic solenoid for being rotated thereby when said electromagnetic solenoid is energized; and a cam plate fixedly secured to said camshaft and having a cam face which includes a portion of minimum length from said camshaft and a portion of maximum length from said camshaft;

said portion of minimum length opposing said urging plate when said electromagnetic solenoid is deenergized, said portion of maximum length engaging said urging plate to bias said plate toward said support block when said electromagnetic solenoid is energized.

3. The printer head according to claim 2, wherein said cam plate is urged at all times by a second urging member in such a manner that said portion of minimum length opposes said urging plate.

4. The printer head according to claim 1, wherein the fixed portion of said drive frame contacted by the distal end of said position adjusting screw is defined by one of said guide rollers.

5. The printer head according to claim 1, wherein said printing head element is connected to a positive electrode of said signal source, and at least one of said guide rollers is electrically conductive and grounded to a negative electrode.

6. The printer head according to claim 5, wherein said ink ribbon is engaged with said electrically conductive guide roller at a predetermined angle of engagement.

7. The printer head according to claim 1, wherein said pair of guide rollers are arranged along a conveyance path of the sheet-like member and function to guide the sheet-like member while it is being conveyed.

8. The printer head according to claim 1, wherein said sheet-like member is a card.

* * * * *

UNITED STATES PATENT AND TRADEMARK OFFICE

CERTIFICATE OF CORRECTION

PATENT NO. : 4,860,028

DATED : August 22, 1989

INVENTOR(S) : Yoshihisa Ogawa

It is certified that error appears in the above-identified patent and that said Letters Patent is hereby corrected as shown below:

Front page, Inventor: "Nagakakyo" should be--Nagaokakyo City

Column 2, line 38, "FIG." should be--FIGS.--.

Column 4, line 51, after "88" insert--is--.

Column 6, line 50, "536" should be--56--.

Column 6, line 53, delete "a" (2nd occurrence).

Column 7, line 36, "pringing" should be--printing--.

Column 8, line 13, after "which" insert--print--.

Column 8, line 51, "2" should be--1--.

Signed and Sealed this

Third Day of September, 1991

*Attest:*

HARRY F. MANBECK, JR.

*Attesting Officer* *Commissioner of Patents and Trademarks*